United States Patent Office 2,907,645
Patented Oct. 6, 1959

2,907,645
METHOD OF AGGREGATING CARBONACEOUS MATERIAL

Waldemar Hartmann, Mountain Lakes, N.J.
No Drawing. Application January 22, 1957
Serial No. 635,126
1 Claim. (Cl. 44—16)

This invention relates to the processing of coal fines and more particularly to the treatment of dry coal fines having a particle size of 20 mesh or less and a moisture content of less than 10%.

Coal fines, coal silt, coke dust and coke flue dust are made up of particles of coal or carbonaceous material. Fly ash dust from industrial plants which is collected to prevent smoke nuisance is composed of fine particles mainly of −300 mesh in size. These particles are extremely small in particle size and are so fine that when dry are buoyant and easily airborne. These particles are produced from a number of different processes all of which have as at least one product particles of such extremely small size that when dry they are readily blown or airborne. The fine material is extremely difficult to handle and is not manageable by normal coal handling means. It is desirable to be able to handle the particles of such material and to reduce its tendency to become airborne. On the other hand, it is imperative that the particles not be sticky and adhere to contiguous surfaces.

Fly ash is made up almost entirely of particles of less than 300 mesh in size. This material has to be kept in water in certain conditions. In saturated condition this material cannot be used.

It is an object of this invention to provide fines of a particle size less than 20 mesh which will not be readily blown or airborne.

It is another object of this invention to provide particles of extremely small particle size in the range of 20 mesh to −400 mesh which may be handled in ordinary coal handling apparatus.

It is still another object of this invention to provide a means and method for producing manageable material from particles of from −20 mesh to −400 mesh in particle size.

It is a still further object of this invention to provide means and method for producing useful material from wet fly ash.

These and other objects of this invention will become more apparent upon consideration of the following description:

In general this invention provides treating fines made up of particles of a size that will pass a 1/32 of an inch screen aperture and will contain less than 10% of moisture by weight of the fines. By the process of this invention a product is obtained which is not readily airborne, but which is manageable and may be formed into small objects such as pellets. These objects are adapted for use in various ways.

The fines or particles which are the subject of this invention are of a size in the range of 20 mesh particles to −400 mesh particles. As indicated above such particles are the by-products or the waste of methods which produce finely comminuted particles. When these processes produce particles in this range of sizes which contain less than 10% of moisture in the product, the troublesome problem of buoyance is presented. The buoyant particles are easily airborne and as a result can be blown by air currents. Such material when shipped in railroad cars will blow away and be dissipated. Material will seep through cracks in handling apparatus, fill cavities and interfere with machine operation.

This buoyant material may be the product of coal combustion or it may be the product of classification procedures after mining of the coal. When the material is the product of incomplete combustion in the burning of coal, the particles occur in the smoke of the coal. Such particles when recovered by collectors are dry and loose and, therefore, difficult to handle. The lack of moisture in the fine particle material causes the mass of small particles to be unmanageable. Similarly, waste particles from coal classification when containing low percentages of moisture are elusive and difficult in storage and handling.

Coal silt ranges in size from particles passing through a screen having openings of 3/64 of an inch down to −200 mesh particles and smaller. Coke flue dust is made up almost entirely of −20 mesh particles and smaller particles. Fly ash is almost completely made up of −300 mesh particles.

A tabulation of coke flue dust contains percentages of particles in a range of sizes as follows:

TABLE IA

|  | Percent |
|---|---|
| 10 mesh | 2.6 |
| 20 | 15.4 |
| 30 | 17.9 |
| 40 | 37.4 |
| 60 | 9.2 |
| Thru 60 | 17.5 |

The following is an analysis of one type of coke flue dust particles which may be treated according to this invention.

TABLE IB

| Constituents: | Percentages |
|---|---|
| Moisture | 0.11 |
| Carbon | 93.89 |
| Ash | 3.00 |
| Volatile matter | 3.00 |

The distribution of sizing of the particles of the coke flue dust of Table IB is 3% plus 200 mesh and 97% −200 mesh.

One source of fly flue ash dust is collection in dust precipitators in smoke control devices. In the collection of fly dust from smoke from anthracite combustion, the smoke first goes through a dust precipitator. After passing through this, the smoke goes through an electrostatic precipitator. In the collection of fly ash from smoke from bituminous coal combustion, the smoke is first passed through the electrostatic precipitator and then through the dust precipitator. The percentage of carbon in the fly ash collected in the second stage of precipitation in both of these methods of collection is less than the percentage of carbon collected in the first precipitation step. The carbon found in the fly ash from the second precipitation step runs about 1 to 2% in carbon. The following are analyses of fly ash collected by precipitation from smoke:

TABLE II

| Constituents | Sample I | Sample II | Sample III |
|---|---|---|---|
|  | Percent | Percent | Percent |
| Silicon dioxide | 54.0 | 54.5 | 53.9 |
| Aluminum oxide | 37.0 | 32.0 | 35.5 |
| Iron oxide | 5.5 | 7.6 | 5.8 |
| Calcium oxide | 0.5 |  | 0.6 |
| Magnesium oxide | 0.8 | 2.2 |  |
| Carbon | 15.6 | 18.0 | 15.7 |
| Sulphur oxide |  | 8.2 | 0.27 |
| Titanium oxide |  |  | 2.07 |
| Magnesium |  |  | 0.8 |
| Sulphur trioxide |  |  | 0.09 |
| Phosphorus oxide |  |  | 0.37 |
| Potassium oxide |  |  | 0.22 |
| Sodium oxide |  |  | 0.23 |

The particles of −200 mesh in size are so easily airborne as to be impossible to handle by ordinary means. By mixing the material with spent sulfite liquor, it has been found that a product is produced which is not easily airborne and at the same time does not develop properties of adhesiveness to the point that it completely loses its free flow characteristics. This transformation of the fine particles of coal containing less than 10% moisture is achieved by mixing the particles with a small percentage of spent sulfite liquor. The fly ash of the above samples contain .5% of particles less than 100 mesh and greater than 200 mesh in size, 1.25% of particles less than 200 mesh and greater than 300 mesh in size and 98% of particles of less than 300 mesh in size.

Spent sulfite liquor is a compound which is made up principally of calcium lignosulfonate. It also may contain sodium lignosulfonate in a substantial proportion, together with certain sugar degradation products. Stated otherwise, it may be considered for the purpose of this description that spent sulfite liquor in general refers to the complex mixture of the salts of low molecular weight of lignosulfonic acids and the alkaline hydrolysis products of pentoses and hexoses which are extracted from coniferous woods in the sulfite pulping process. The spent sulfite liquor also contains tannin and ash in appreciable percentages.

The Journal of Technical Association of the Pulp and Paper Industry, at page 555, indicates that calcium lignosulfonates comprise some 60% of spent sulfite solids, while the sugar products make up about 20% of the total spent sulfite solids. Also included in the spent sulfite may be calcium and magnesium oxides, sulfite as $SO_4$ and other substances which make up the remainder of the spent sulfite solids. The spent sulfite liquor is a solution of the spent sulfite solids in water. The liquor is about half water by weight. The specific spent sulfite compounds referred to herein are defined as to composition in greater detail below.

The spent sulfite liquor contains 2–4% free $SO_2$, 2–7% $SO_3$, 2–5% $SO_4$, 80–90% solids and 12–16% ash with calcium compounds, carbohydrates and lignone sulfonate. The following Table III sets forth the products available as identified by their trademark names and associated with the supplying companies.

TABLE III

| Company | Name | Lbs. per gallon |
|---|---|---|
| International Paper Company | Bindarene | 10.04 |
| Marathon Corp | Norlig | 10.08 |
| Lake States Yeast Corp | Toranil A | 10.05 |
| Robeson Process Co | Glutrin | 10.08 |

All of these compounds contain the waste spent sulfite.

The following are the analyses of the chemical compositions and characteristics of the spent sulfite compounds, set forth in Table III, as identified by the trademark names listed therein:

*Characteristics of Bindarene liquid*

Brown viscous liquid
Completely miscible in water
50% water solution
Specific gravity, 1.26 (30° Baumé)
pH, 5.5
Viscosity, 175 centipoises 20° C. (60 r.p.m. Brookfield)
Boiling point, 212° F.
Freezing point, 17° F.
Heat value, 3900 B.t.u.'s
Sugar content, 20% of solids
Calcium lignosulfonate, 70% of solids
Inorganic material, 10% of solids

*Typical chemical analysis of Bindarene liquid*

Solids basis: Average, percent
Volatile acids _____ 3.9
Total sulfur _____ 4.1
Free sulfur dioxide _____ 0.2
Sulfur trioxide _____ 0.8
Sulfone $SO_2$ _____ 6.6
Calcium oxide _____ 4.3
Iron _____ 0.02
Magnesium oxide _____ 1.9
Sodium oxide _____ 0.3

*Characteristics of Toranil A*

Coffee colored viscous liquid.
Specific gravity (60° F./60° F.) _____ 1.24
Baumé, degrees _____ 28.5
Viscosity (cp.):
 70° C. _____ 45
 50° C. _____ 130
 30° C. _____ 420
pH (50% water solution) _____ 4.5 to 4.6
Boiling range, ° C. _____ 107 to 108
Freezing range, ° C. _____ 4 to 6
Surface tension (dynes/cm.) (10% water solution) _____ 48

*Typical chemical analysis of Toranil dry solids—non-summative*

Percent
Calcium lignosulfonate _____ 96.0
Total carbohydrates _____ 4.0
Reducing sugars (as glucose) _____ 1.2
Methoxyl _____ 8.8
Tannin _____ 49.4
Ash _____ 17.3
Calcium and magnesium as oxide _____ 7.50
Sulfate (as $SO_4$) _____ 8.70
Silica (as $SiO_2$) _____ 0.60
 (As oxide) _____ 0.27
Iron and aluminum (as phosphate) ____ 0.03
Insolubles _____ 0.17

*Typical chemical analysis of Glutrin*

Percent
Water _____ [1] 48.75
Ash _____ 5.82
Iron _____ .011
Calcium oxide _____ 2.52
Magnesium oxide _____ 1.35
Solids _____ 51.25
pH _____ 6.90

[1] Baumé 31.00, 60°.

The powdered solid products from spent sulfite liquor can also be used to treat the fine, dry particles according to this invention. The spent sulfite solids obtained by dehydrating spent sulfite liquor form a powder containing small percentages of water of the order of 7%. These powdered solids may be mixed with water to provide a fluid which when applied to the fine, dry particles according to the treatment of this invention will produce the desired results. The following table sets forth two spent sulfite solid products available as identified by their trademark names and associated with the supplying company. These products may be used to form a fluid for treatment of the particles.

TABLE IV

| Company | Name |
|---|---|
| Marathon Corporation | Marasperse C. / Marabond. |

The following are the analyses of the chemical compositions of the solid components from spent sulfite set forth in Table IV, as identified by the trademark names listed therein:

Typical chemical analysis of Marasperse C

| | |
|---|---|
| Moisture | 7.00% maximum. |
| pH—3% solution | 6.7–7.3. |
| Total sulfur as S | 4.97% on moisture free basis. |
| Sulfate sulfur as S | 0.25% on moisture free basis. |
| Sulfite sulfur as S | None. |
| CaO | 3.83% on moisture free basis. |
| MgO | 0.39% on moisture free basis. |
| $Na_2O_3$ | 3.50% on moisture free basis. |
| $Fe_2O_3$ | 0.17% on moisture free basis. |
| Reducing sugars | None. |
| $OCH_3$ | 9.74% on moisture free basis. |

Typical chemical analysis of Marabond

| | Percent |
|---|---|
| $CaSO_4 \cdot \frac{1}{2}H_2O$ | 0.68 |
| $CaSO_3 \cdot H_2O$ | 2.63 |
| $Fe_2O_3$ | 0.05 |
| $Al_2O_3$ | 0.16 |
| $SiO_2$ | 0.28 |
| Sulfonic $SO_3$ | 10.25 |
| Sulfonic Ca | 2.56 |
| $CaCO_3$ | 2.41 |
| CaO over | 7.58 |
| MgO | 0.26 |
| Inorganics | 26.86 |
| Organics | 73.14 |
| Calcium lignosulfonate | 77.98 |

The use of the solid products of spent sulfite liquor permits these compounds to be shipped as a powder and turned into a fluid at the point of use by adding water and thus effecting a saving in transportation.

This invention provides for the processing of the fine particles and particularly the particles of —200 mesh in size which contain less than 10% in moisture and particularly —200 mesh particles containing less than 6% moisture by weight into a material which remains comminutable but is held together by a slight adhesion which prevents the particles from becoming easily airborne. Thus, the buoyant, blowable characteristics of the fine dry particles are counteracted by a mixing of spent sulfite liquor into the material. The amount of spent sulfite liquor which must be mixed or otherwise incorporated with the particles is related to the percentage of moisture in the particles. The percentage of spent sulfite liquor is also dependent upon the average fineness of the particles. The finer particles require a greater proportion of the spent sulfite liquor to produce the same results.

This process may be used for treating dry, fine particles. Coal silt containing less than 10% of moisture may be treated according to this invention to produce a product which is coherent and forms easily breakable lumps. The silt has lost its objectionable buoyancy while not taking on an undesirable adhesiveness which may cause the silt to stick to metal surfaces. Large percentages of spent sulfite liquor will result in a product which contains an excess of moisture and accordingly will be more in the nature of a liquid slurry of coal particles. Such a product, however, may be useful for some purposes. The treatment of the dry, fine particles of coal with the spent sulfite liquor permits the treated product to be easily handled without objectionable dissipation through the blowing away of the particles. Coke dust and fly ash in the dry condition are objectionably buoyant. These materials treated with spent sulfite liquor are converted to a material which can be formed into small coherent nonsticky bodies. The forming of the treated particles into small bodies is effected by only slight pressure. Substantial pressure in the forming of the bodies is not desirable. The forming operation puts the particles together into a body so that they just hold together for the purpose of handling. The formation of a hard body is avoided. The material thus formed can then be employed in various uses. It has been determined that treating coke dust with spent sulfite liquor in a proportion of 5% of liquor by weight of the coke dust will produce satisfactory properties in the coke dust. The air buoyancy of the particles is removed and the material may be formed under pressure into coherent nonsticky bodies. Fly ash on the other hand requires a somewhat higher percentage of spent sulfite liquor to produce an all together satisfactory product. A satisfactory product has been obtained by treating coke flue dust with 7% of Toranil A spent sulfite liquor.

Similarly the treatment of dry coal silt with 3% by weight of the spent sulfite liquor produces some modification of the fine particle material. 4% of the spent sulfite liquor applied to dry coal silt produces a product which forms bodies which are coherent but crumble easily under pressure. 5% by weight of spent sulfite liquor mixed in dry particles of coal silt produces a product which can be formed in a hard pellet. The following examples are illustrative of the processing of the particles with spent sulfite liquor and are not limitative upon the scope of the invention.

EXAMPLE I

Coke flue dust of the composition and sizing set forth in Table IB was treated by heating to 170° F. Spent sulfite liquor was heated to about 170° F. applied to the heated dust. The soft flexible material was then put through a pelletizing machine and cut to the proper sizes without clogging the pelletizing machine or forming a stiff mass.

The product was not buoyant nor adhesive. It handled easily without sticking to surfaces and was not easily blown by air currents. The treated material is formed into small bodies or pellets. The pellets are adaptable to use in chemical processes, while they are coherent bodies they are not hard or tenaciously agglutinated.

EXAMPLE II

Coke dust of a sizing of a full 100% —200 mesh with an ash content of 2.8% and a moisture content of 5% was heated to about 170° F. in a tank. Spent sulfite liquor was heated to about 170° F. The coke dust was blown into a converter tube. The heated spent sulfite liquor was sprayed on the coke dust. The material was heated by a hot air stream blown into the converter. The coke dust and the heated spent sulfite liquor were blown by compressed air into the converter which has a pelletizer for cutting the treated material into pellets. The suspended and heated material was mixed with the heated spent sulfite liquor. The coke dust and the spent sulfite liquor coact one with the other. The treated material is accumulated and passes through the pelletizer.

The coke dust was worked to work in the spent sulfite. The treated coke dust was passed through the pelletizing machine and formed into pellets of ⅛ of an inch to ¼ of an inch in length. Upon completion the pellets contained less than 15% moisture content and had sufficient strength to withstand normal handling in conveying machinery such as chutes and bucket elevators. The pellet bodies into which the treated coke dust is formed are adhered together for suitable easy handling but are susceptible to modification and conversion in use.

Moist fly ash can be treated by the powdered solids derived from spent sulfite liquor to form a material which is non-sticky but is sufficiently coherent so as not to be easily airborne.

The advantages of this invention include the adaptation of the dry, fine particles of coal to various uses while avoiding the problems of stickiness and blowing away. The treated product may be formed into flaxy or fluffy bodies or in the shape of pellets or other suitably formed shapes. The product of treating coke flue dust or silt is useful as a fuel or in chemical processes involving carbon. The product can be handled in normal fashion and can be shoveled, poured, screened and slid through over and against surfaces. The product may be carried in open cars under normal weather conditions with only normal loss and deterioration.

As a further advantage of this invention, the fine carbonaceous particles, particularly coke flue dust may be incorporated in paint as a pigment. Finally the product may be deprived of its moisture and return to a relatively anhydrous condition if such condition is desired for some use after delivery.

In the above description, illustrative embodiments have been set forth by way of explanation. It will be understood that modifications of the specific procedures and percentages may be made in accordance with the spirit of the invention set forth herein. Accordingly, it is intended that this invention be limited only by the scope of the appended claim.

What is claimed is:

The method of aggregating a carbonaceous material which is initially in the form of a substantially dry powder having not over about 10% by weight of water and which consists essentially of particles smaller than 300 mesh, the initial fine dry material being readily airborne, said method comprising the step of mixing said carbonaceous material with a treating material consisting essentially of spent sulfite liquor in the form of an aqueous solution containing about half water and about half solids by weight, said mixing step being effected with the named materials in the proportions of about 100 parts by weight of said carbonaceous material to about 3 to about 7 parts by weight of said sulfite liquor.

References Cited in the file of this patent

UNITED STATES PATENTS

| | | |
|---|---|---|
| 1,119,500 | Ellis | Dec. 1, 1914 |
| 1,246,807 | Ellis | Nov. 13, 1917 |
| 2,778,718 | Hartmann | Jan. 22, 1957 |